G. A. BOYDEN, Jr. AND J. C. BOYDEN.
RAILWAY CAR TRUCK.
APPLICATION FILED MAR. 17, 1920.

1,341,780.

Patented June 1, 1920.

Inventors
George A. Boyden, Jr.
and John C. Boyden
By John W. Harley
Attorney

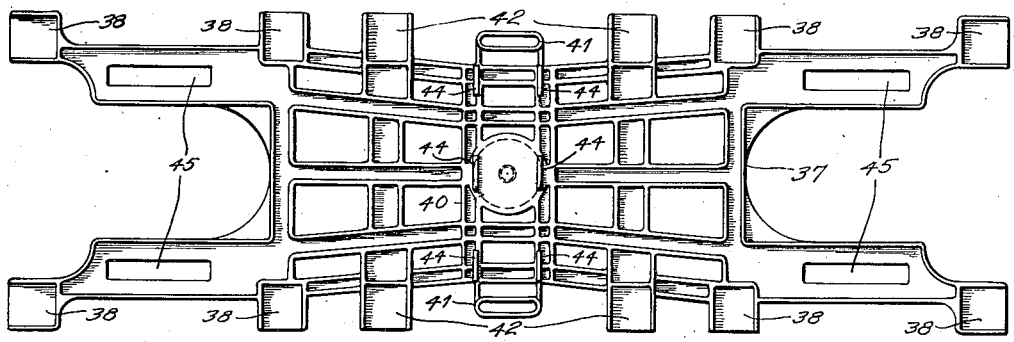
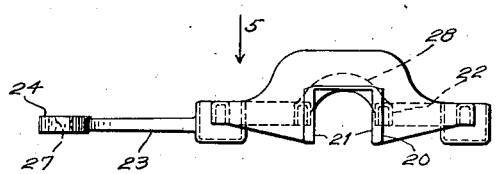
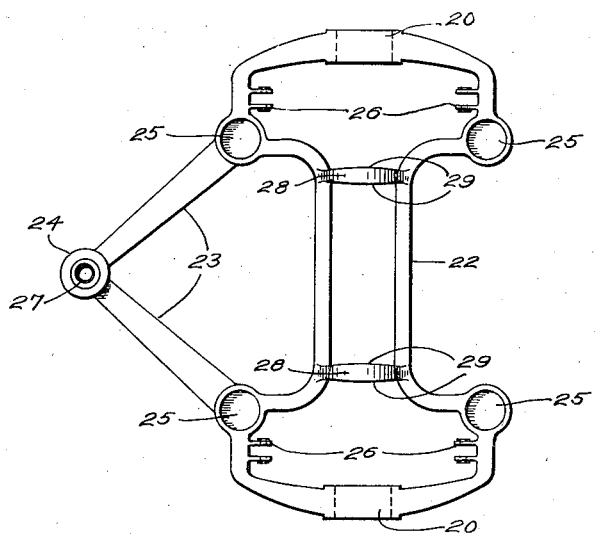

G. A. BOYDEN, Jr., AND J. C. BOYDEN.
RAILWAY CAR TRUCK.
APPLICATION FILED MAR. 17, 1920.
1,341,780.
Patented June 1, 1920.
3 SHEETS—SHEET 3.
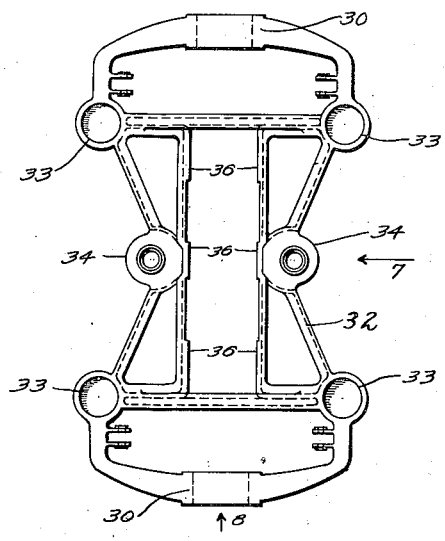
Fig. 6
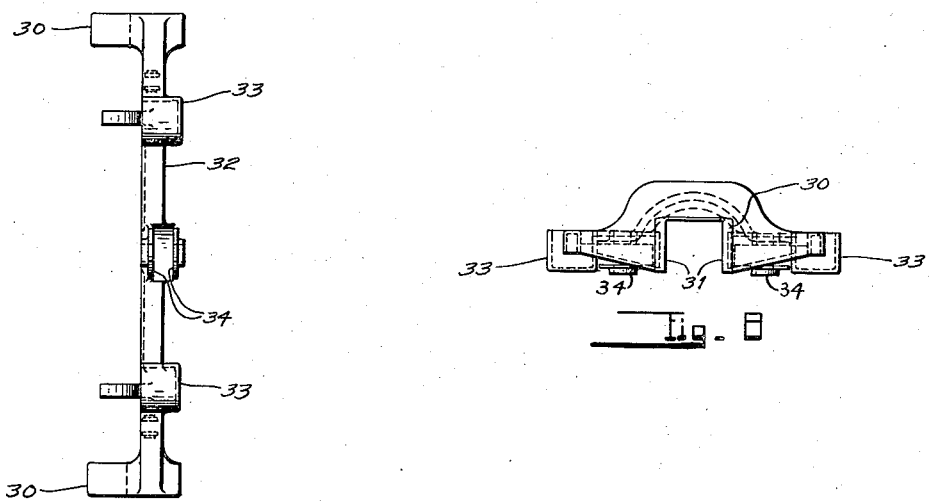
Fig. 7
Fig. 8
Inventors
George A. Boyden, Jr.
and John C. Boyden
By John W. Clarley
Attorney

UNITED STATES PATENT OFFICE.

GEORGE A. BOYDEN, JR., AND JOHN C. BOYDEN, OF BALTIMORE, MARYLAND.

RAILWAY-CAR TRUCK.

1,341,780.  Specification of Letters Patent.  Patented June 1, 1920.

Application filed March 17, 1920. Serial No. 366,477.

*To all whom it may concern:*

Be it known that we, GEORGE A. BOYDEN, Jr., and JOHN C. BOYDEN, citizens of the United States, residing at Baltimore, in the State of Maryland, have invented certain new and useful Improvements in Railway-Car Trucks; and we do hereby declare the following to be a full, clear, and exact description of the invention, such as will enable others skilled in the art to which it appertains to make and use the same.

Our invention relates to railway car trucks.

Our application for U. S. Letters Patent for railway car trucks, (Case A), which was filed May 22, 1919, and serially numbered 298953, involves a truck comprising members that act coördinately horizontally so that the wheels and journals will conform to the contour of the rails, whatever it may be.

The truck shown in Case A also involves vertical actions of the members which differ from equalized vertical actions because when a wheel moves over a portion of a rail having an abnormal surface or a subnormal supporting capacity, then the vertical action upon said wheel is instantly differentiated from the vertical actions upon the other wheels and the vertical actions upon the wheels are rendered disparate with reference to each other. Said disparate vertical actions are fully set forth and the methods and means by which they are effectuated are explained, described and claimed in our application for U. S. Letters Patent for railway car trucks (Case C), which was filed February 21, 1920, and serially numbered 360481.

Our application for U. S. Letters Patent for railway car trucks, (Case B), which was filed August 5, 1919, and serially numbered 315427, involves a truck comprising members that act coördinately horizontally as in the truck described in Case A, and which, in addition, have equalized vertical actions wherein the vertical actions of the members shown in Case B differ from the vertical actions of the members shown in Cases A and C.

Among the objects of the invention covered by our present application (Case E), is:

To provide a method according to which the journals are placed in such mutual relations and in such mutual angularity as to reduce the stresses against the wheel flanges produced by the outer rail of a curve near its junction with a tangent and also, to minimize the pressure of the rails against the wheel flanges when any or all of the wheels are running upon curves, while distributing the load stresses from the coördinating plate to the journal members through springs that are so placed and so constructed as to produce vertical actions upon said journal members which differ from the equalized vertical actions described in Case B and from the disparate vertical actions described in Case C.

By reference to Case B, it will be noted that the load stress is distributed from the coördinating plate to the end journal members and said journal members distribute a portion of the load stress to the central journal member. It follows from this construction that while the journal members will have free vertical movement with reference to each other, yet angularity of the axles with reference to each other in vertical planes is provided for only by the springs between the journal boxes and the pedestals.

By reference to Case C, it will be noted that the load stress is distributed from the coördinating plate through springs to the journal members and each journal member distributes its portion of the load stress to the corresponding wheels through springs placed between the pedestals and the axle boxes. It is further to be noted that the journal members are articulated so that they may move relatively to each other in a horizontal plane, but are prevented from moving relatively to each other in a vertical plane.

In the present Case E, it will be noted that the load stress is distributed from the coördinating plate through springs to the journal members and there are no springs between the pedestals and the axle boxes. It is also to be noted that the end members are articulated to the central member in such a manner that the end members may have free horizontal, vertical and angular movements with reference to the central member.

One embodiment of our improved truck is shown in the accompanying drawings, in which:

Fig. 3 is a view of the coördinating plate taken as viewed in the direction of the arrow 3 in Fig. 2.

Fig. 4 is a side view of either the pilot or trailer bolsters.

Fig. 5 is a view of the bolster shown in Fig. 4 looking in the direction of the arrow 5 in said figure.

Fig. 6 is a plan view of the central bolster.

Fig. 7 is a view of the bolster shown in Fig. 6 looking in the direction of the arrow 7 in said figure.

Fig. 8 is a view of the bolster shown in Fig. 6 looking in the direction of the arrow 8 in said figure.

Figure 1:
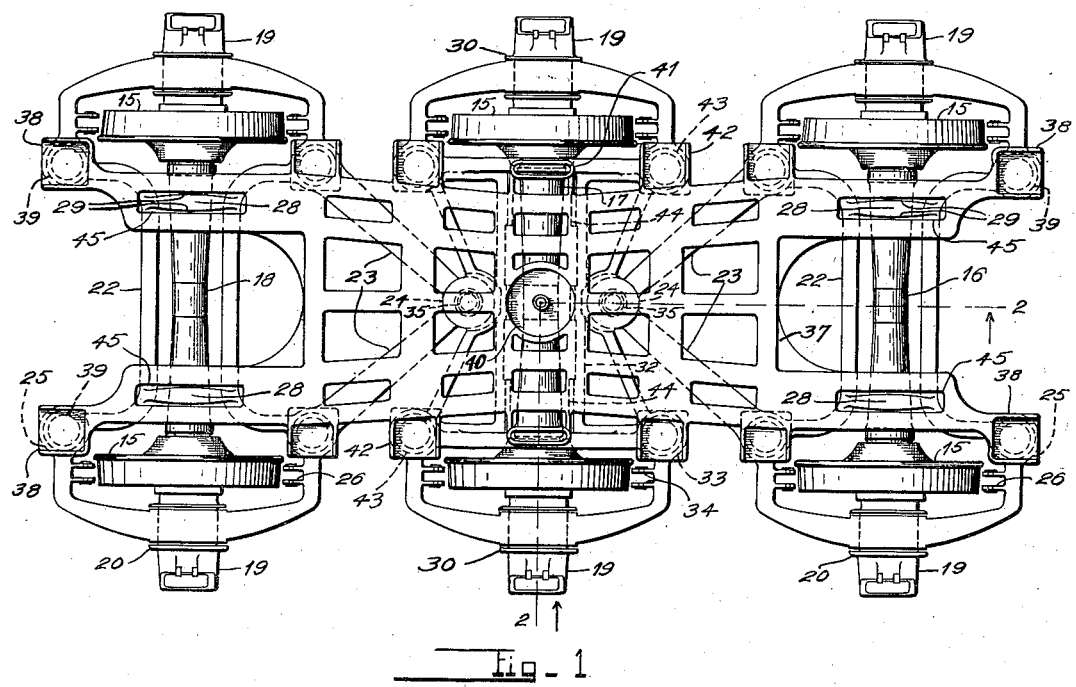
Figure 1 is a plan view of a truck constructed in accordance with our invention.
Figure 2:
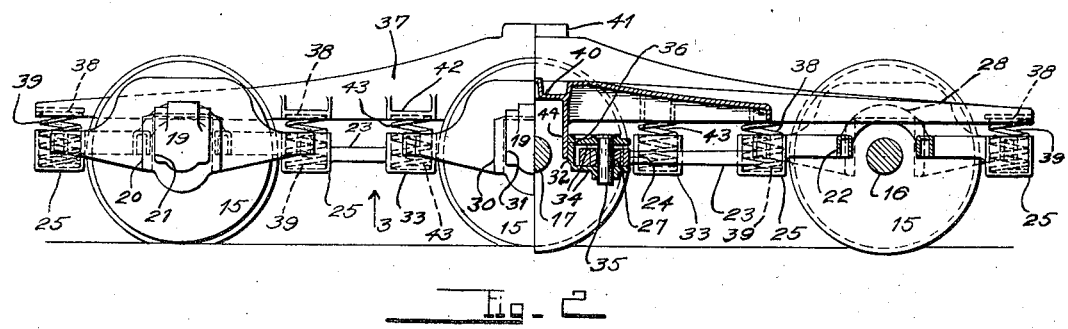
Fig. 2 is a side view of the truck shown in Fig. 1, said view being shown partly in section, and the section being taken as along the line 2—2 in Fig. 1, looking in the direction of the arrows.

Throughout the specification and claims, a longitudinal movement or stress will be that in the direction of the length of the rails, and a transverse movement or stress will be that in a direction transverse to the rails.

In the drawings:—

15 represents the wheels and 16, 17 and 18 represent, respectively, the pilot, central and trailer axles.

The journals of the axles are mounted in any approved form of axle box, such as 19, and the axles and wheels are of Master Car Builders' construction.

Each pilot and trailer bolster consists of a pair of pedestals such as 20, each pedestal being provided with jaws 21 for the reception of the axle box 19, which fits snugly therein.

The pedestals 20—20 of each end member are joined together by the frame 22 and said frame is provided with arms 23—23 terminating in the boss 24. The frame 22 is provided with four spring cups 25 and with ears 26 for the support of brake shoes. The brake shoes forming no part of our present invention are not illustrated or described.

The boss 24 is provided with a hole 27, the surface of which is substantially that of a hyperboloid of revolution of one nappe for a purpose hereinafter explained.

The frame 22 is provided with a pair of rocker bearings 28, each bearing being provided with curved side surfaces such as 29—29.

The central bolster consists of a pair of pedestals such as 30, each pedestal being provided with jaws 31 for the reception of the axle box 19 which fits snugly therein. The pedestals 30—30 of the central member are joined together by the frame 32 and said frame is provided with four spring cups 33 and with ears for the support of brake shoes. The brake shoes forming no part of our present invention are not illustrated or described.

The frame 32 is provided on each side with a pair of ears 34, each pair of ears being provided with holes for the reception of one of the pins 35. One of the bosses 24 is introduced between each pair of the ears 34 and one of the pins 35 passing through the hole 27 serves to connect the corresponding end member with the central member.

The frame 32 is provided with six finished surfaces 36 on the inner surfaces thereof for a purpose hereinafter explained.

It is to be noted that each end member is connected with the central member on the side of the latter adjacent to said end member. It is furthermore to be noted that by reason of the shape of the surface of the hole 27 and the fact that the thickness of the boss 24 is less than the distance between the inner surfaces of the ears 34, each end member, in addition to revolving in a horizontal plane around the corresponding pin 35, can move angularly in vertical planes on said pin. Thus the articulation of each end member with the central member is substantially a universal joint.

The coördinating plate 37 is provided with four spring cups 38 two on each end thereof, each of which registers with one of the spring cups upon either the pilot or trailer bolster and springs 39 placed within said cups serve to transmit a portion of the vertical load stress from the king pin 40 and truck side bearings 41 to the pilot and trailer bolsters.

The coördinating plate 37 is also provided with four spring cups 42 located near the middle thereof, each of which registers with one of the spring cups 33 upon the central bolster, and springs 43 placed within said cups serve to transmit a portion of the vertical load stress from the king pin 40 and truck side bearings 41 to the central bolster.

The king pin 40 is pivotally connected with the car body in any approved manner and any approved form of side bearings are secured upon said body to form a sliding bearing upon the truck side bearings 41.

The coördinating plate 37 is provided with six gibs 44 finished on the outer surface thereof which project downwardly and each has a sliding bearing upon one of the finished surfaces 36 of the frame 32, thus connecting the coördinating plate and the central bolster together in such a manner that while the former can have angular movements in a vertical plane and vertical and transverse movements with reference to the latter, yet, the latter is forced to partake of the angular movements in a horizontal plane of the former.

The coördinating plate 37 is provided with two rectangular slots 45 near each end thereof, the sides of each of which embrace the curved surfaces 29 of one of the bearings 28 so that each of said bearings may have vertical and longitudinal movements as well as angular movements within the corresponding slot. The truck members act coördinately horizontally according to the method set forth in Case A, with the exception that the pilot and trailer bolsters are articulated to the central bolster on the near side thereof. This construction has been adopted in the truck shown in the present application in order to provide for a slightly different relative angular movement of the members from the movement of the corresponding members shown in Case A.

The springs 39 and 43 are made of such diameters with reference to their respective spring cups that the coördinating plate 37 may move horizontally relative to the various members as herein described.

The coördinating plate 37 has a fixed vertical relation to the car body, but it may swing angularly about the king pin 40.

Movements of the end and central bolsters with reference to the coördinating plate are permitted by the resilience of the springs 39 and 43 and provide for the utmost freedom of the wheels in following the vertical contour of the rails.

As set forth in Case A, the coördinate horizontal movements of the members provide for the utmost freedom of the wheels in following the horizontal contour of the rails.

Thus, the truck illustrated and described in this present Case E provides for the minimization of the friction due to the vertical and transverse stresses against the rails and thus insures a minimization of the longitudinal stress against the draw bar, which eventuates in a great reduction of the operating cost.

We claim:—

1. In six wheel trucks for railway transportation, the combination of three journal members, each end member being mounted on a pivot on the near side of the central member, whereby each end member moves only angularly about said pivot.

2. In six wheel trucks for railway transportation, the combination of three journal members, each end member being mounted on a pivot on the near side of the central member by a universal joint, whereby each end member moves only angularly about said pivot.

3. In six wheel trucks, the combination with a bolster for each axle, a universal connection between the central bolster and each of the pilot and trailer bolsters, and a coördinating plate having a transverse sliding connection with the central bolster, a longitudinal sliding connection with each of the pilot and trailer bolsters, and vertically resilient connections with each of the pilot, trailer and central bolsters.

4. In six wheel trucks, the combination with a bolster for each axle, a universal connection between the central bolster and each of the pilot and trailer bolsters, said connections for each of said pilot and trailer bolsters being on the near side of said central bolster, and a coördinating plate having a transverse sliding connection with said central bolster, a longitudinal sliding connection with each of said pilot and trailer bolsters, and vertically resilient connections with each of the pilot, trailer and central bolsters.

5. In six wheel trucks, the combination with a bolster for each axle, a universal connection between the central bolster and each of the pilot and trailer bolsters and a coördinating plate having a transverse sliding connection with the central bolster, a longitudinal sliding connection with each of the pilot and trailer bolsters, and load distributing connections with each of the pilot, trailer and central bolsters.

6. In six wheel trucks, the combination with a bolster for each pair of journals, a coördinating plate engaging with the central bolster and with each of the pilot and trailer bolsters to control the mutual angularity of said journals, and springs between said coördinating plate and each of said bolsters.

7. In six wheel trucks, the combination with a rigid structure subjected to the vertical load stress, of pilot, trailer and central bolsters articulated together and engaging said structure and springs having lower ends mounted upon each of said bolsters and upper ends supporting said structure.

In testimony whereof, we affix our signatures.

GEORGE A. BOYDEN, Jr.
JOHN C. BOYDEN.